(12) United States Patent
Hardin et al.

(10) Patent No.: US 12,244,726 B2
(45) Date of Patent: Mar. 4, 2025

(54) DATA SYSTEM WITH INFORMATION PROVENANCE

(71) Applicant: THE TRUSTEES OF DARTMOUTH COLLEGE, Hanover, NH (US)

(72) Inventors: Taylor Hardin, Lebanon, NH (US); David Kotz, Lyme, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 511 days.

(21) Appl. No.: 17/189,704

(22) Filed: Mar. 2, 2021

(65) Prior Publication Data
US 2021/0273812 A1    Sep. 2, 2021

Related U.S. Application Data

(60) Provisional application No. 62/984,045, filed on Mar. 2, 2020.

(51) Int. Cl.
*H04L 9/32* (2006.01)
*H04L 9/06* (2006.01)
*H04L 9/08* (2006.01)

(52) U.S. Cl.
CPC .......... *H04L 9/3247* (2013.01); *H04L 9/0637* (2013.01); *H04L 9/0643* (2013.01); *H04L 9/0825* (2013.01); *H04L 9/0894* (2013.01)

(58) Field of Classification Search
None
See application file for complete search history.

(56) References Cited

U.S. PATENT DOCUMENTS

| 2015/0335947 | A1* | 11/2015 | Kaushansky | ........ G16H 40/63 340/870.07 |
| 2017/0319063 | A1* | 11/2017 | Verdooner | ........ A61B 5/4809 |

(Continued)

FOREIGN PATENT DOCUMENTS

| CN | 110661790 | * | 9/2019 | |
| CN | 110661790 | A * | 1/2020 | ........ G06Q 40/04 |

OTHER PUBLICATIONS

Ayoade, Gbadebo "Decentralized IoT Data Management Using Blockchain and Trusted Execution Environment" [online] IEEE, Jul. 2018 [retrieved Jul. 15, 2023]. Retrieved from the Internet: URL: https://ieeexplore.ieee.org/document/8424682 (Year: 2018).*

(Continued)

*Primary Examiner* — Taghi T Arani
*Assistant Examiner* — Joshua Raymond White
(74) *Attorney, Agent, or Firm* — Cozen O'Connor (57) ABSTRACT

A secure, integrated data system and method users both blockchain and Trusted Execution Environment (TEE) technologies to achieve information provenance for data, particularly, mobile health device data. Using a blockchain to record and enforce data access policies removes the need to trust a single entity with gatekeeping the health data. Instead, participants form a consortium and collectively partake in verifying and enforcing access policies for data stored in private data silos. Data access and computation takes place inside of TEEs, which preserves data confidentiality and provides a verifiable attestation that can be stored on the blockchain for the purpose of information provenance.

10 Claims, 7 Drawing Sheets

(56) References Cited

U.S. PATENT DOCUMENTS

2019/0354693 A1* 11/2019 Yoon .................. H04L 9/50
2020/0327250 A1* 10/2020 Wang .................. G06N 20/00

OTHER PUBLICATIONS

Zhang, Shifa "Genie: a Secure, Transparent Sharing and Services Platform for Genetic and Health Data" [online] Arxiv, Nov. 2018 [retrieved Jul. 15, 2023]. Retrieved from the Internet: URL: https://arxiv.org/pdf/1811.01431v1.pdf (Year: 2018).*

Liang, Xueping "Towards Decentralized Accountability and Self-Sovereignty" [online] ResearchGate, Dec. 2017 [retrieved Jul. 15, 2023]. Retrieved from the Internet: URL: https://www.researchgate.net/publication/321137917_Towards_Decentralized_Accountability_and_Self-Sovereignty_in_Healthcare_Systems (Year: 2017).*

Ayoade, Gbadebo "Decentralized IoT Data Management Using Blockchain and Trusted Execution Environment" [online] IEEE, Jul. 2018 [retrieved Jul. 15, 2023]. Retrieved from the Internet: URL: https://ieeexplore.ieee.org/document/8424682 (Year: 2019).*

Janjua, Hassaan "Trusted Operations on Sensor Data" [online] MDPI, Apr. 2018 [retrieved Jul. 15, 2023]. Retrieved from the Internet: URL: https://www.mdpi.com/1424-8220/18/5/1364 (Year: 2018).*

Greene et al., "Secure sharing of mHealth data streams through cryptographically-enforced access control," *Smart Health*, 2018, DOI 10.1016/j.smhl.2018.01.003, 25 pages.

Chen et al., "Blockchain-Based Medical Records Secure Storage and Medical Service Framework," *Journal of Medical Systems*, vol. 43, No. 5, Nov. 22, 2018, 9 pages.

Dagher et al., "Ancile: Privacy-preserving framework for access control and interoperability of electronic health records using blockchain technology," *Sustainable Cities and Society*, vol. 39, Feb. 2018, pp. 283-297.

Fan et al., "MedBlock: Efficient and Secure Medical Data Sharing Via Blockchain," *Journal of Medical Systems*, vol. 42, No. 8, Jun. 21, 2018, pp. 136, 2018.

Mense et al., "Concept for Sharing Distributed Personal Health Records with Blockchains," *Studies in Health Technology and Informatics*, vol. 251, 2018, pp. 7-10.

Wang et al., "Secure Cloud-Based EHR System Using Attribute-Based Cryptosystem and Blockchain," *Journal of Medical Systems*, vol. 42, No. 8, Jul. 5, 2018, 9 pages.

Liu et al., "BPDS: a Blockchain Based Privacy-Preserving Data Sharing for Electronic Medical Records," IEEE Global Communications Conference, 2018—Proceedings. Institute of Electrical and Electronics Engineers Inc., Dec. 2018, 6 pages.

Mikula et al., "Identity and access management with blockchain in electronic healthcare records," *Proceedings—21st Euromicro Conference on Digital System Design, DSD 2018*. Institute of Electrical and Electronics Engineers Inc., Oct. 2018, pp. 699-706.

Li et al., "Blockchain-Based Data Preservation System for Medical Data," *Journal of Medical Systems*, vol. 42, No. 8, Jun. 28, 2018, 13 pages.

Mohammadi et al., "CUREX: Secure and private health data exchange," *Proceedings—2019 IEEE/WIC/ACM International Conference on Web Intelligence Workshops, WI 2019 Companion*, 2019; pp. 263-268.

Zhao et al., "Blockchain-based privacy-preserving remote data integrity checking scheme for IoT information systems," *Information Processing and Management*, vol. 57, No. 6, 2020, 12 pages.

J. Li et al., "Blockchain-based public auditing for big data in cloud storage," *Information Processing and Management*, vol. 57, No. 6, Sep. 18, 2020, 17 pages.

Cheng et al., "Design of a Secure Medical Data Sharing Scheme Based on Blockchain," *Journal of Medical Systems*, vol. 44, No. 22, Jan. 8, 2020, 11 pages.

* cited by examiner

DATA SYSTEM WITH INFORMATION PROVENANCE

RELATED APPLICATION

This application claims priority to U.S. Patent Application Ser. No. 62/984,045, filed Mar. 2, 2020, which is incorporated herein in its entirety by reference.

BACKGROUND

Mobile health (mHealth) devices are becoming increasingly popular, both for personal use and for clinical research and treatment. These devices offer the ability to continuously monitor aspects of an individuals' health as they go about their everyday life and activities. Many believe that mHealth devices will change the nature of healthcare by allowing providers a more holistic view of an individual's health. An mHealth device may be a smartwatch, heart monitor or glucose monitor, for example. For this belief to become a reality, however, there must first exist a data system in which providers and individuals can securely and privately share their health data.

Creating such a system is not without its challenges, as mHealth technologies vary and the data they produce may fall under the purview of different parties (e.g., device manufacturers, healthcare providers, private individuals). Thus, providing information provenance, or the ability to trace the origin of data, is one of the main requirements for data systems that aim to connect disparate mHealth data silos. The sensitive nature of health data poses a significant barrier to providing information provenance, however.

Health data contains identifying personal information that must be protected by law (e.g., HIPAA, GDPR), but in many cases, it is necessary to reveal this information to prove the validity and authenticity of certain data.

There is a need for a secure, integrated health data system that ensures patients have confidence in the privacy of their original health data that may be managed by multiple entities, and provides security and information provenance for that data while it is aggregated or transformed during interactions between patients and healthcare professionals.

SUMMARY

In an embodiment, a secure, integrated data system leverages both blockchain and Trusted Execution Environment (TEE) technologies to achieve information provenance for mobile health device data. Using a blockchain to record and enforce data access policies removes the need to trust a single entity with gatekeeping the health data. Instead, participants form a consortium and collectively partake in verifying and enforcing access policies for data stored in private data silos. Data access and computation takes place inside of TEEs, which preserves data confidentiality and provides a verifiable attestation that can be stored on the blockchain for the purpose of information provenance.

A method of maintaining information provenance of confidential data in a data system comprising a blockchain network and a trusted execution environment (TEE) network comprising hardware and software for providing secure execution of instructions stored in a computer-readable memory includes receiving a message comprising confidential data collected by a device and one or more signatures identifying the device and a data subject; encrypting the message with a data key unique to the device to form encrypted data; storing the encrypted data in a datastore; receiving an index from the datastore indicating a location of the encrypted data; generating a provenance metadata packet by calculating a hash of the message, encrypting the data key unique to the device and combining the hash, the encrypted data key and the index to form the provenance metadata packet; and writing the provenance metadata packet to the blockchain network.

A method of performing computations on encrypted confidential data in a data system comprising a blockchain network and a trusted execution environment (TEE) network comprising hardware and software for providing secure execution of instructions stored in a computer-readable memory includes receiving a request from an application to access the encrypted confidential data to perform a computation; requesting provenance metadata from a blockchain interface; checking to determine whether the application has permission to access the encrypted confidential data and to perform the computation; if application has the permission, the blockchain provides provenance metadata, an encrypted computation program and encrypted data keys; verifying a signature of the application; retrieving the encrypted confidential data from a datastore; decrypting the encrypted data keys with the master data key, then decrypting the encrypted confidential data and program using the decrypted data keys and verifying hashes of the decrypted data; and performing the computation on the decrypted data using the decrypted computation program.

The method of performing computations may also include receiving a message comprising confidential data resulting from a computation; encrypting the message with a key unique to the computation that produced the confidential data to form encrypted data; storing the encrypted data in a datastore; receiving an index from the datastore indicating a location of the encrypted data; generating provenance metadata comprising the index, a hash of the message and an encrypted data key of the computation; and writing the provenance metadata to the blockchain network.

A system for maintaining information provenance of confidential data includes a device generating raw data; a datastore for storing encrypted data; a blockchain network storing smart contracts and information provenance metadata; and a trusted execution environment (TEE) network comprising hardware and software for providing secure execution of instructions stored in a computer-readable memory, said TEE network receiving raw data from the device; encrypting the raw data to produce encrypted data; storing the encrypted data in the datastore; recording provenance metadata on the blockchain; verifying the provenance of data retrieved from the datastore using the provenance metadata previously recorded on the blockchain; executing confidential computations on data retrieved from the datastore; and recording information provenance metadata on the blockchain for verifying the results of confidential computations

DETAILED DESCRIPTION

In an embodiment, a data system with information provenance is designed to preserve the confidentiality and integrity of sensitive health data. Data confidentiality and integrity must be upheld for both source data and derived health data (i.e., data that was created through a series of aggregations and transformations of source health data sets). The data system with information provenance may receive confidential data and information from a number of devices, such as smartphones and mobile health (mHealth) devices, then store and process that input and information using a blockchain and trusted execution environment (TEE) components.

Systems that collect data using mHealth devices are often implemented using different technologies and the data that they produce may fall under the purview of various parties (e.g., device manufacturers, healthcare providers, private individuals). Any device that collects raw data from a data subject, for example, heart rate or blood pressure.

Thus, providing information provenance—the ability to trace the origin of data—one of the main focuses for data systems that aim to connect disparate mHealth data silos. One aspect of the present embodiments includes the realization that the sensitive nature of health data poses a significant barrier to providing information provenance. Health data contains identifying personal information that by law must be protected (e.g., HIPAA, GDPR), but in many cases, it is necessary to reveal this information to prove the validity and authenticity of a said data. The present embodiments solve this problem by using a secure, integrated health data system that leverages both blockchain and Trusted Execution Environment (TEE) technologies to achieve information provenance for mobile health device data. Advantageously, this ensures patients have confidence in the privacy of their original health data and allows access to and further use of the data while maintaining a secure record and confidentiality.

Blockchain technology features a distributed trust model, transparency, and immutability that offers secure and verifiable data trails amidst semi-trusted parties. Data systems can use a blockchain to record metadata (e.g., a hash) for health data being stored in traditional off-chain databases, record who has access to what data, and record instances of data access. The blockchain ensures that the hash and access records are immutable and visible to all participants so that they can verify the validity and authenticity of health data that is shared with them. While data confidentiality is maintained (since no actual health data is stored on the blockchain), a blockchain only provides a basic level of information provenance in that it can track and verify the movement of health data but not what happens to that data after it has been shared. This kind of information provenance is not sufficient, as data may then be aggregated and transformed to create new data, or information. The term information provenance may be used to refer to the ability to trace the origin of information that may have been derived from a series of aggregations and transformations on many input and intermediary data sets. Thus, while transactions on the blockchain are secure and verifiable, it does not provide a mechanism to enforce and verify actions that take place outside of the blockchain network.

A blockchain may be generally understood as a database implemented on a network of processing nodes, of append-only time-stamped records that are cryptographically linked to protect from tampering and revision. Unlike traditional databases that are managed by a central authority, a blockchain is a distributed database managed by many semi-trusted participants. Users submit transactions to the blockchain network of processing nodes, which contain new data to be recorded or smart contract invocations. The nodes that maintain the blockchain network, often referred to as miners, are responsible for validating these transactions and bundling them into blocks that are later added to the blockchain. Each miner maintains and updates its own local copy of the blockchain via a consensus algorithm, which ensures that the majority of the nodes agree on exactly what data is being added to the blockchain and in what order. Once added to the blockchain, data is visible to all participants of the network and cannot be modified or removed. Along with logging basic transactions (e.g., Bob pays Alice 10 Bitcoin) some blockchains support smart contracts, which allow developers to encode arbitrary logic that is uploaded to, and executed by, the miners in the blockchain network. In effect, a smart contract is a permanent, immutable, collection of functions that all nodes execute upon the arrival of certain types of transactions. Due to the transparent nature of blockchains, all data that passes through the blockchain (whether it is input, intermediate, or output) is visible to those participating in the network and therefore not confidential. While blockchains provide pseudo-anonymity to its users via public key cryptography, it has been shown that this is easily subverted.

Another tool used with blockchains is confidentiality-preserving smart contracts, which utilize technologies such as secure multi-party computing, zero-knowledge proofs, and Trusted Execution Environment (TEE) hardware for sensitive computations performed off-chain. However, using a TEE, for example, does not provide a record of information provenance as data is aggregated and transformed to create new data.

A Trusted Execution Environments (TEEs) may be used when a certain level of security and confidentiality is preferred or required. It may be implemented with a variety of security guarantees depending on the context. As generally understood, a TEE may be a processing environment that is both physically tamper-resistant processing environment running software on a separation kernel. In addition, the terms Enclave or Secure Enclave are sometimes used to refer to a TEE while other times may simply refer to a Trusted Application running on a TEE. A TEE may guarantee the authenticity and integrity of both the executed code and the runtime states, as well as processing information as it is stored on a persistent memory. In addition, a TEE may be able to provide remote attestation that proves its trustworthiness for third-parties.

As used herein, the term Enclave refers to an application that is meant to be executed in a Trusted Execution Environment. The Enclave contains sensitive code and/or data that the developer wishes to protect from the surrounding system.

A Trusted Execution Environment refers to a secure computing environment that resistant to privileged software attacks (i.e., those from an OS or hypervisor) and lightweight physical attacks (i.e., those on hardware outside of the CPU). The Trusted Execution Environment guarantees the authenticity and confidentiality of Enclave code and its run-time states, as well as the confidentiality of Enclave code and data stored off-chip in persistent memory. Furthermore, Trusted Execution Environments provide Enclaves with several trusted-computing functionalities such as data sealing, integrity measurement, remote attestation, and secrets provisioning.

Data sealing refers to the process of encrypting Enclave data for persistent storage outside of the TEE. The data-sealing key is unique to the TEE platform and Enclave, thus ensuring that encrypted data is "bound" to that specific Enclave.

Integrity measurement refers to a process performed by the TEE when first loading Enclave code to ensure that the code has not been tampered with while stored in persistent memory.

Remote attestation refers to a process for proving to parties outside of the TEE platform (i.e., code executing on a different machine) that an Enclave has been unmodified and is running on a genuine TEE platform.

Secrets provisioning refers to a method for establishing a secure communication channel between an enclave and an outside party; this method is bound to the remote attestation process to ensure that the remote party only shares secrets with a specific enclave that has been attested.

Blockchain systems may be used in data systems for many reasons, including transparency, immutability and distributed trust they provide, which may bolster the security, interoperability, and auditability of existing data systems. Blockchain-based data systems may be used to maintain and provide access control to provider managed Electronic Health Record (EHR) data. Along with data access policies, the blockchain stores metadata (e.g., a hash) for maintaining the integrity of health data being stored off-chain and records instances of data access for auditing purposes. While these systems achieve secure and distributed access control for medical data, they do not support confidential and efficient ways to compute on said data. Smart contracts are capable of performing such computations, but due to blockchain's transparency, and the redundant execution of smart contracts by every mining node, this would reveal sensitive health data to all of the network participants and be highly inefficient.

Several techniques for achieving data confidentiality on the blockchain are possible: zero-knowledge proofs (ZKPs), multi-party computations (MPCs), and trusted execution environments (TEEs). ZKPs and MPCs may provide greater cryptographic security guarantees than TEEs, but are computationally more expensive making it difficult to support complex operations. In an embodiment, a data system with information provenance uses TEEs for data confidentiality to support general computations (simple or complex) in a cost-effective way.

Data confidentiality, integrity, and provenance must be upheld for both source data and derived information (i.e., information created through a series of aggregations and transformations of source data). Data systems may be vulnerable to attempts to access information by those who are not entitled to it, usually referred to as adversaries. To protect data systems, possible attacks by adversaries are analyzed and categorized in the process of developing security counter measures.

Security Model

Data confidentiality and integrity must be preserved against an attempted access from an adversary. An adversary may be understood to be an entity that (1) wishes to gain access private health data to learn sensitive information about one, or many, individual(s), (2) wishes modify private health data, or (3) wishes to pass off false health data as authentic. It is reasonable to assume the adversary can gain access to a TEE node and some small portion of the blockchain network.

In an embodiment, a data system with information provenance uses a blockchain maintain the integrity of the data it stores and the integrity of the smart contract operations it performs. For these properties to hold, the consensus algorithm may be capable of preventing attackers from modifying the blockchain even if they have some significant portion of control over the blockchain network. It is reasonable to assume that the majority of the blockchain nodes act in good faith when executing the consensus protocol, in other words, that a majority of the blockchain nodes are not controlled by an adversary.

In an embodiment, a data system with information provenance has several secure applications, or Enclaves, that are responsible for storing, retrieving, modifying, and sharing mHealth data. These Enclaves rely on TEEs to provide a secure and confidential computing environment for handling sensitive mHealth data. In an embodiment, Trusted Execution Environments (TEEs) provide outside parties with attestations to the correct execution of code without violating data confidentiality. It is reasonable to assume that the TEE hardware is correctly manufactured such that it can guarantee the authenticity of the executed code, the integrity of the runtime states, and the confidentiality of its code while preventing outside entities (OS, hypervisor, applications) from gaining access or control.

It is further reasonable to assume that an individual's smartphone correctly and securely aggregates data from the individual's mHealth devices and sends the encrypted data batches to the TEE node for storage. In context, the smartphone correctly executes our health data collection application and has secure storage for protecting encryption keys and sensitive health data.

Further, it is reasonable to assume that mHealth devices, regardless of type or manufacturer, operate correctly; they produce accurate data and they can securely communicate with a smartphone. They may also have ways to authenticate the data subjects so as not to produce data for the incorrect data subject.

System Components

Figure 1:
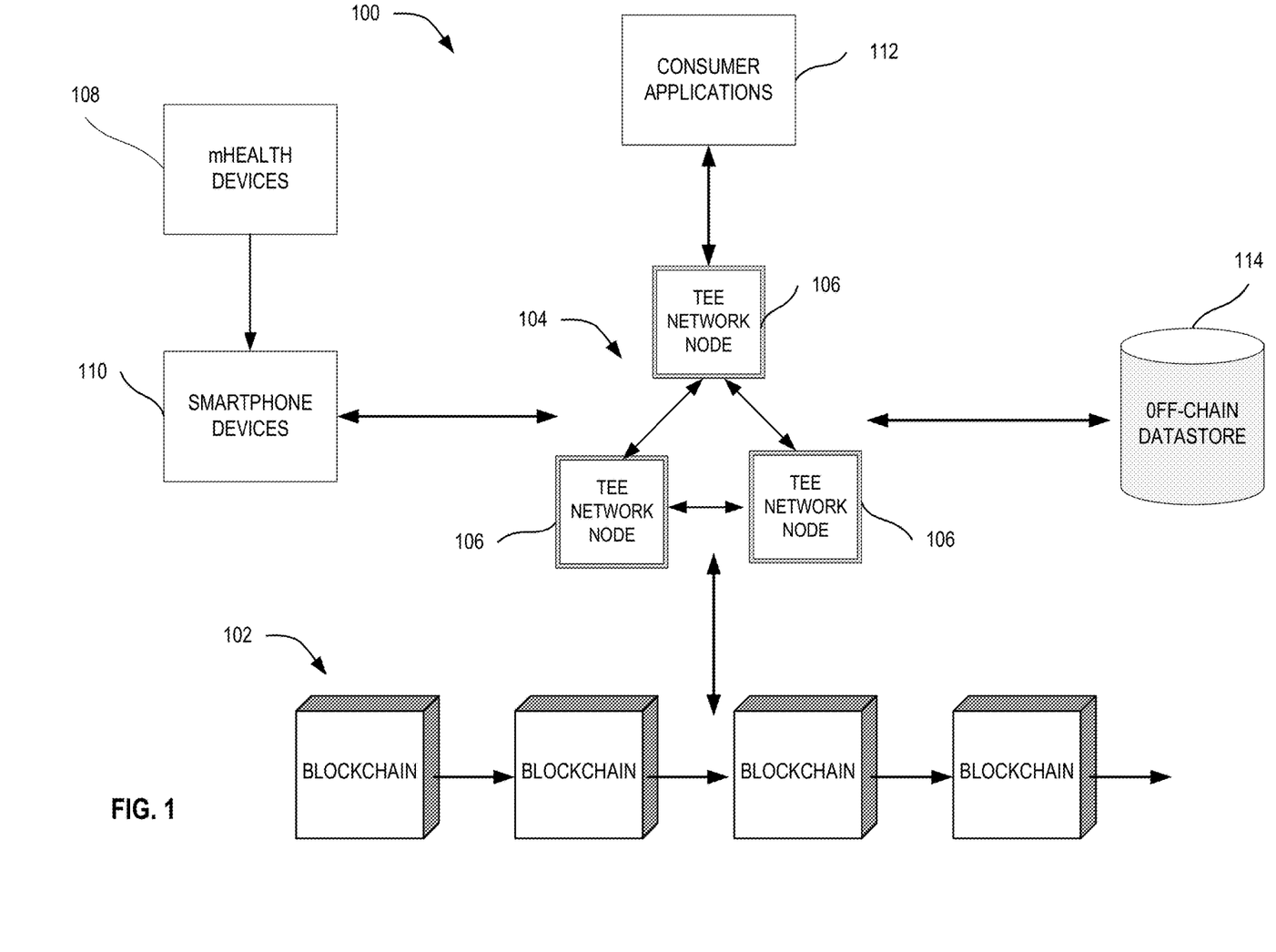
FIG. 1 is a diagram illustrating components of a data system with information provenance, in embodiments.

In embodiments, a data system 100 with information provenance may include a number of components as depicted in FIG. 1. Although specific components are described and shown herein, it should be understood that components may be combined or split up into a fewer or large number of components. Further, various embodiments may only encompass some of the components described herein, or additional components may be added.

A. Blockchain Network

In embodiments, a data system 100 with information provenance includes a consortium-based blockchain network 102, which provides a suite of smart contracts that allow individuals to share and manage their mHealth data in a confidential yet verifiable fashion. The consortium may be, for example, made-up of healthcare, and healthcare related, service providers (e.g., hospitals, clinics, insurance providers). This approach eases inter-organization information sharing, because each organization may use the blockchain to verify the authenticity and validity of shared data. As a consortium-based blockchain, permission to execute, validate, and add transactions to the blockchain is reserved for miner nodes operated by the consortium members, but, as the contents of the blockchain are public, individuals can still read data from the blockchain and submit transactions they wish to be executed.

Currently, individuals trust (often due to a lack of other options) health-service providers to manage their private health data, but they have no way to verify that their data is being handled correctly. By requiring healthcare providers to use a publicly-readable blockchain for data-access decisions, individuals (or watchdogs like consumer-protection organizations) are afforded a look into how sensitive data is managed. The exact number of nodes required to run blockchain component is implementation-specific, and thus left up to the members of the health consortium; the number of nodes depends on many factors, including how many participants are in the network, availability, cost, etc.

In embodiments, each consortium member participates in the blockchain network in some capacity so as to ensure the availability of the network and to maintain the distributed and immutable nature of the blockchain.

B. Trusted Execution Environment

Blockchain network 102 provides users the ability to manage health data (i.e., requesting, granting, and revoking access). In embodiments, a distributed network 104 of TEE nodes 106, or servers provide hardware mechanisms that guarantee the confidentiality of executed code and its associated data. Similar to the blockchain mining nodes, TEE nodes 106 may be maintained by members of the blockchain consortium (not by individuals). Actions upon mHealth data are performed inside a TEE network node 106 to ensure that data remains confidential and that actions can be verified. To this end, system 100 provides several Enclaves implemented on TEE nodes 106 that facilitate secure and confidential creation, storage, retrieval, modification, and dissemination of mHealth data and information.

By using the TEE's "remote attestation" feature, enclaves can prove (to relevant individuals and organizations) that they are legitimate Enclaves executing on TEE hardware. Attestation reports produced by enclaves, along with other relevant metadata, are stored on the blockchain network 102 to create a transparent record of data creation, storage, sharing, and modification that can be verified by data owners and consumers without the need to provide them access to the source data. While provenance metadata is stored in the blockchain, the actual health data is encrypted and stored in off-chain storage services. Storage services may be owned and managed by different service providers, but the keys used to encrypt health data reside in protected TEE memory and on the blockchain (in encrypted form).

Thus, once stored in the system, mHealth data can only be decrypted by a secure enclave running in TEE network 104. Again, like the blockchain component, the number of TEE nodes is implementation-specific and left up to the members of the health consortium. Ideally, they would choose a number that is sufficient to guarantee availability of the system and to ensure that the TEE component remains distributed amongst the consortium members. In other words, there should not be a single, centralized, TEE node or cluster that is responsible for granting access to the blockchain network and off-chain datastore.

C. Smartphones & mHealth Devices

Mobile health devices 108, for example, smart watches or other monitors, can be used to monitor different aspects of an individual's health as they go about their everyday life and activities. These devices produce continuous streams of raw data from one or more sensors, which is then offloaded to an individual's smartphone 110 or another mobile device. The smartphone serves two purposes: (1) to act as a gateway device for the mHealth device to store its data in the data system with information provenance and (2) to create a root of trust that can later be used to authenticate and verify data produced by an individual's mHealth device 108. The details of how this "root of trust" is created are presented below. In embodiments, the gateway device to the data system with information provenance may also be a smartwatch, tablet, laptop, or a non-mobile device, for example. Any reference to smartphone herein should be understood to encompass any device capable of providing an interface between a data collection device and the data system with information provenance.

In embodiments, all derived health information may ultimately be traced back to data generated by mHealth devices 108. To guarantee that data produced by mHealth devices 108 is stored and shared in a secure but verifiable way, it is desirable to provide information provenance for subsequent modifications and aggregations made to the source data. A data system 100 provides a secure foundation for information provenance through use of cryptographic primitives (e.g., digital signatures and encryption) and the provenance metadata recorded on blockchain network 102.

D. Consumer Applications

In embodiments, system 100 serves as a back-end data management solution for applications 112 that wish to consume mHealth data for the purpose of providing healthcare-related services. Consumer applications should adhere to the protocol laid out in data-life-cycle described herein.

E. Off-chain Data Store

In embodiments, off-chain data store 114 is any storage device that is capable of storing a data item and returning an 'index' that can later be used to retrieve that same item. It is an immutable data store, and needs no other database features (like indexing, searching, or manipulating data).

Enclaves

In embodiments, distributed network 104 of TEE nodes 106 runs instances of three different Enclaves: Data Storage, Data Processing, and Blockchain Interface. Users interact with these enclaves to store, retrieve, manipulate, and share their mHealth data and derived information. Brief descriptions for each Enclave are provided below, with detailed breakdowns of the Enclaves' functionalities and their interactions describe below.

A. Data Storage Enclave

The Data Storage Enclave (DSE) is used to store and retrieve mHealth data. As will be described in more detail below, the DSE is responsible for collecting and validating provenance metadata every time mHealth data is stored or read from storage.

B. Data Processing Enclave

The Data Processing Enclave (DPE) is a secure application for executing confidential smart contracts in a TEE nodes 106. This application communicates with the Data Storage application (DSE) when it needs to retrieve input for a computation or to record the computation's output.

C. Blockchain Interface Enclave

The Blockchain Interface Enclave (BIE) is a secure application that is used by the Data Processing and Data Storage enclaves to interact with the blockchain. The BIE handles reading and writing data to and from the blockchain, invoking smart contracts, and verifying permissions for data requests.

Keys & Key Management

In an embodiment, system 100 uses asymmetric keys for identifying and authenticating data subjects and data sources, as well as symmetric keys for protecting the confidentiality of sensitive health data. These keys summarized in Table 1 and discussed below in detail.

TABLE 1

| Name | Symbol | Type |
| --- | --- | --- |
| Identification Key | PK | Asymmetric |
| Signing Key | SK | Asymmetric |
| Date Key | K | Symmetric |
| Sealing Key | S | Symmetric |
| Master Data Key | $K_{MASTER}$ | Symmetric |

A. Identification Key

In embodiments, the Identification Key refers to the public component of an asymmetric key pair, (PK, SK). Identification keys are denoted $PK_{NAME}$, where NAME is the name of the entity the key belongs to (e.g., a health app, health device, confidential computation, or an individual). As the name suggests, Identification keys are used to identify a particular individual or entity in system 100. Furthermore, each Identification key has a verification function, denoted PK( ), that is used to verify a signature created by the corresponding Signing key in the pair (PK, SK).

As part of the blockchain protocol, all users (e.g., individuals, consortium members) are given asymmetric key pairs that are used to identify and authenticate themselves when transacting on the blockchain. In embodiments, mHealth devices and applications have unique asymmetric key pairs that can be used to identify and authenticate data sources.

B. Signing Key

In embodiments, the Signing Key refers to the private component of an asymmetric key pair, (PK, SK). Signing keys are denoted $SK_{NAME}$, where NAME is the name of the entity the key belongs to (e.g., a health app, health device, confidential computation, or an individual). Signing keys provide a function, denoted SKO, that allow the owner of a Signing Key to sign (i.e., authenticate) data.

C. Data Key

In embodiments, the Data Key refers to a symmetric encryption key that is used to encrypt data streams. Data keys are denoted $K_{NAME}$, where NAME is the name of device or application that produced the data stream. Data keys provide a function for encrypting/decrypting data, denoted KO. Data keys are used by the Data Storage Enclaves to encrypt incoming mHealth data streams before writing them to off-chain storage. Data Keys are stored on the blockchain so that they persist and are accessible to all DSE instances; when necessary, any TEE server may service the mHealth data source. Storing Data keys in plaintext on the blockchain would make them available to anyone, of course, so Data keys are first encrypted with the Master Data Key (described below) before being written to the blockchain.

D. Sealing Key

In embodiments, the Sealing Key refers to a symmetric encryption key that is unique to, and can only be derived by, a specific enclave running on a specific TEE platform. Sealing keys are denoted $S_{NAME}$, where NAME is the name of the relevant enclave (e.g., DSE, DPE, or BIE). Sealing keys provide a function for encrypting/decrypting data, denoted S( ). Sealing keys are used by enclaves to encrypt "secrets" (e.g., cryptographic keys and sensitive data) that should persist between enclave execution instances. For example, if an enclave is provisioned with a secret that it wishes to reuse the next time it is instantiated it can "seal" that secret and write it to persistent storage. The next time the enclave is instantiated it can re-derive its Sealing Key and decrypt the secret. In system 100, Enclaves use their Sealing Key to encrypt the Master Data Key so that they continue to have access to it after being stopped and restarted.

E. Master Data Key

In embodiments, the Master Data Key refers to the symmetric encryption key that is used to encrypt and decrypt Data Keys stored on the blockchain. Whereas there are multiple Identification, Signing, Data, and Sealing keys, there is only one Master Data Key in the Amanuensis System. The Master Data Key is denoted $K_{MASTER}$, and its function for encrypting/decrypting data is denoted $K_{MASTER(\ )}$. During a one-time setup phase, the Master Data Key is generated by one DSE, which then registers itself with the EnclaveRegistry contract described in smart-contracts. Subsequent DSEs that join the network can then look-up existing enclaves on the registry and retrieve the Master Data Key through the remote attestation and secrets provisioning mechanisms provided by TEEs.

Smart Contracts

In embodiments, system 100 uses a blockchain to track off-chain health data, provenance metadata, data-access policies, mHealth apps and devices, and confidential computation binaries. These data are organized and accessed via smart contracts, which are programs that are stored on, and executed by, the miners in blockchain network 102. Much like traditional programs, smart contracts have variables, functions, and persistent memory. Blockchain network 102 provides five distinct smart contracts for interacting with the blockchain: DataSource, ConfidentialComputation, SourceRegistry, ComputationRegistry, and EnclaveRegistry. For the purposes of explanation, four smart contracts are described and associated with identifying names, however, any number of smart contracts with any type of identifier may be used to enable the functioning required to provide system 100.

A. DataSource Smart Contract

In embodiments, a DataSource Smart contract records information for identifying a particular mHealth data source (e.g., mHealth application or device), the data that it produces, and for setting data-access policies. On the blockchain, there is an instance of the DataSource contract for every mHealth data source in system 100. There are two entities that directly interact with this contract: the data source owner and the Blockchain Interface Enclave (BIE). Data source owners may invoke the DataSource Smart Contract functions (via a smartphone or desktop application) to grant, or revoke, access to their data by adding or removing a data consumer's blockchain identity to or from, for example, a permissions mapping variable.

The BIE serves as a proxy for the other Enclaves (Data Storage and Data Processing) when they wish to interact with the blockchain. Some of these interactions involve adding and retrieving provenance metadata to and from DataSource contracts, as well as verifying data-access permissions for a given data consumer. Every time a new batch of data is added to the system (i.e., saved in off-chain storage), provenance metadata is added to the DataSource contract associated with the device that produced the batch of data. To track provenance metadata, the DataSource contract makes use of a data structure referred to as record_t comprised of (1) a hash of the mHealth data batch, (2) an index that can be used to locate that batch in off-chain storage, (3) an encrypted form of the key that was used to encrypt the batch of mHealth data, and (4) an attestation report generated by the Enclave that stored the data. Other fields may also be included in record_t.

B. ConfidentialComputation Smart Contract

Functionally similar to the DataSource smart contract, the ConfidentialComputation contract records information for identifying confidential programs, their resulting data (i.e., information), and for setting data-access policies, in embodiments. On blockchain network 102, there is an instance of the ConfidentialComputation contract for every confidential program in system 100. There are two entities that directly interact with this contract: the computation owner and the Blockchain Interface Enclave (BIE). The information maintained by the ConfidentialComputation contract comprises (1) a public identifier of the confidential program's owner, (2) an encrypted program containing logic for a specific computation, (3) a list of data hashes, (4) a list of storage indexes, (5) a list of attestation reports, (6) a list of authorized data consumers, and (7) a list of input data. The program is stored on the blockchain to ensure that it never changes and remains tied to the data that it produced. A list of input data storage indexes is kept to provide informational-level provenance (i.e., the resulting data of a confidential computation can be tied to all of its input data, which themselves have attestations and proofs of provenance). While the confidential computation's program is stored on the blockchain, it is never actually executed by nodes in the blockchain network (the way that smart contracts are). Instead, the encrypted program is sent to an enclave where it is decrypted and executed to ensure that the computation and the data it uses remains confidential. Any reference to "computation program" herein encompasses any form of instructions interpretable by hardware and software capable of processing instructions stored in a computer-readable memory.

C. Registry Smart Contracts

There are three registry contracts: SourceRegistry, ComputationRegistry, and EnclaveRegistry that make it easy locate specific smart contracts and enclaves. Whereas there is a different smart contract instance for every mHealth data source and each confidential program, there is only one instance of each registry contract. These registry contracts should be deployed by an admin account managed by the blockchain consortium. When users deploy a smart contract instance for their health data source or confidential program, they register it with the SourceRegistry or ComputationRegistry (respectively) so that Enclave applications can find its contract when performing data storage, retrieval, and modification operations. The EnclaveRegistry is populated by the blockchain consortium and contains a list of IP addresses of active Amanuensis TEE servers on which users can interact with Enclaves.

Data Life Cycle

In embodiments of system 100, all derived health information can ultimately be traced back to its original source, i.e., to data generated by mHealth apps and devices. Ensuring that data produced by these mHealth technologies are stored and shared in a secure but verifiable way provides information provenance for subsequent modifications and aggregations made to the source data. Confidential but verifiable information provenance may be provided, for example, by three major data-flows described herein: Adding mHealth Data, Confidential Computations, and Adding Information. Table II provides a quick-reference list of symbols used herein.

TABLE 2

| Symbol | Meaning |
| --- | --- |
| A | attestation report |
| APP | mHealth application |
| BIE | Blockchain Interface Enclave |
| C | batch of mHealth data (ciphertext) |
| CC | confidential computation |
| D | batch of mHealth data (plaintext) |
| DPE | Data Processing Enclave |
| DSE | Data Storage Enclave |
| H | hash |
| HD | mHealth device |
| I | Storage index |
| J | Data Key (ciphertext) |
| K | Data Key (plaintext) |
| $K_{MASTER}$ | Master Data Key |
| L | list of input data batches |
| M | mHealth data message |
| P | provenance packet |
| PK | Identification Key |
| R | data processing request result |
| SIG | signature |
| SK | Signing Key |
| SP | smartphone |

Figure 2:
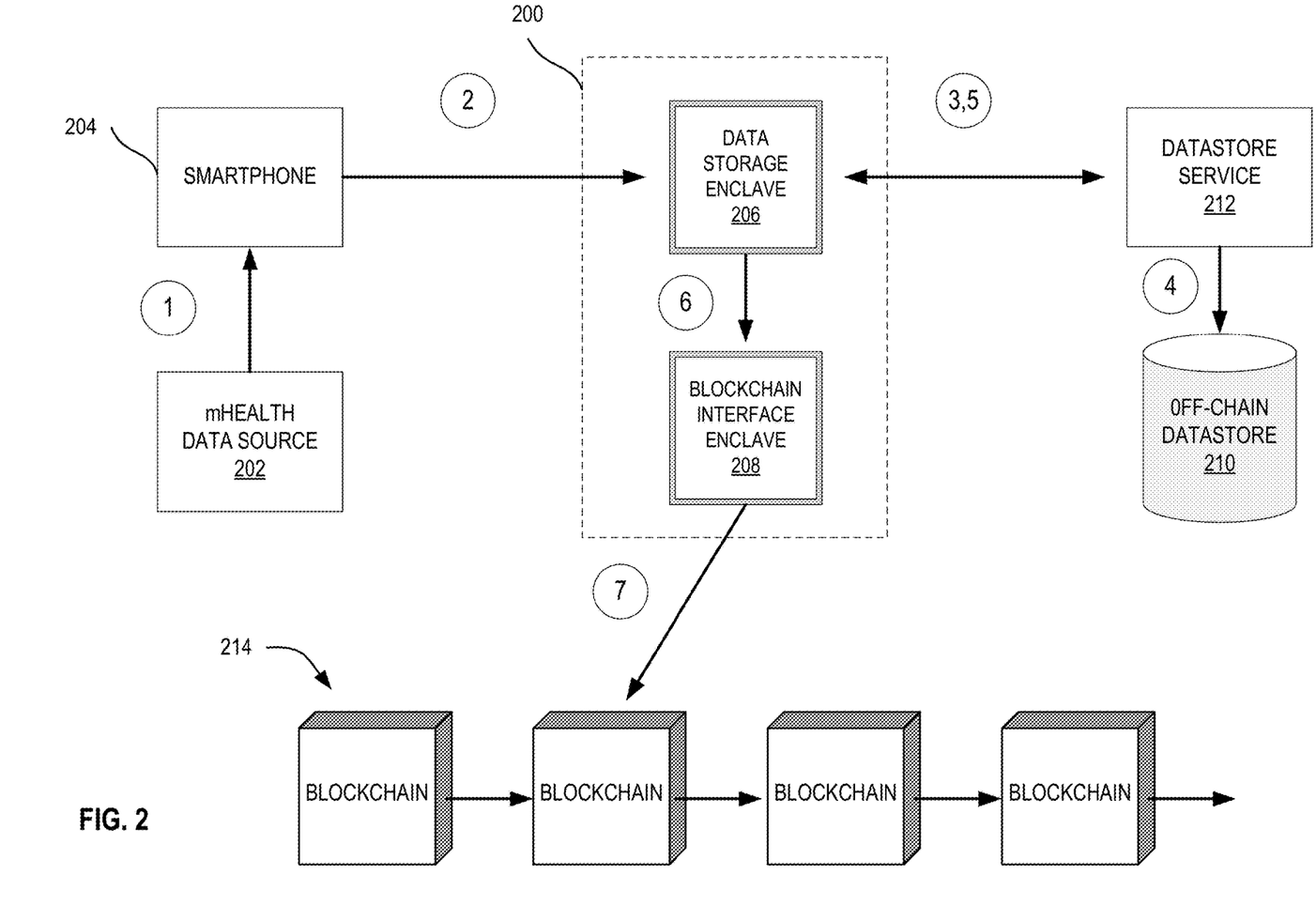
FIG. 2 is a diagram illustrating data flows and interactions when adding mHealth data to the system of FIG. 1, in embodiments.
Figure 3:
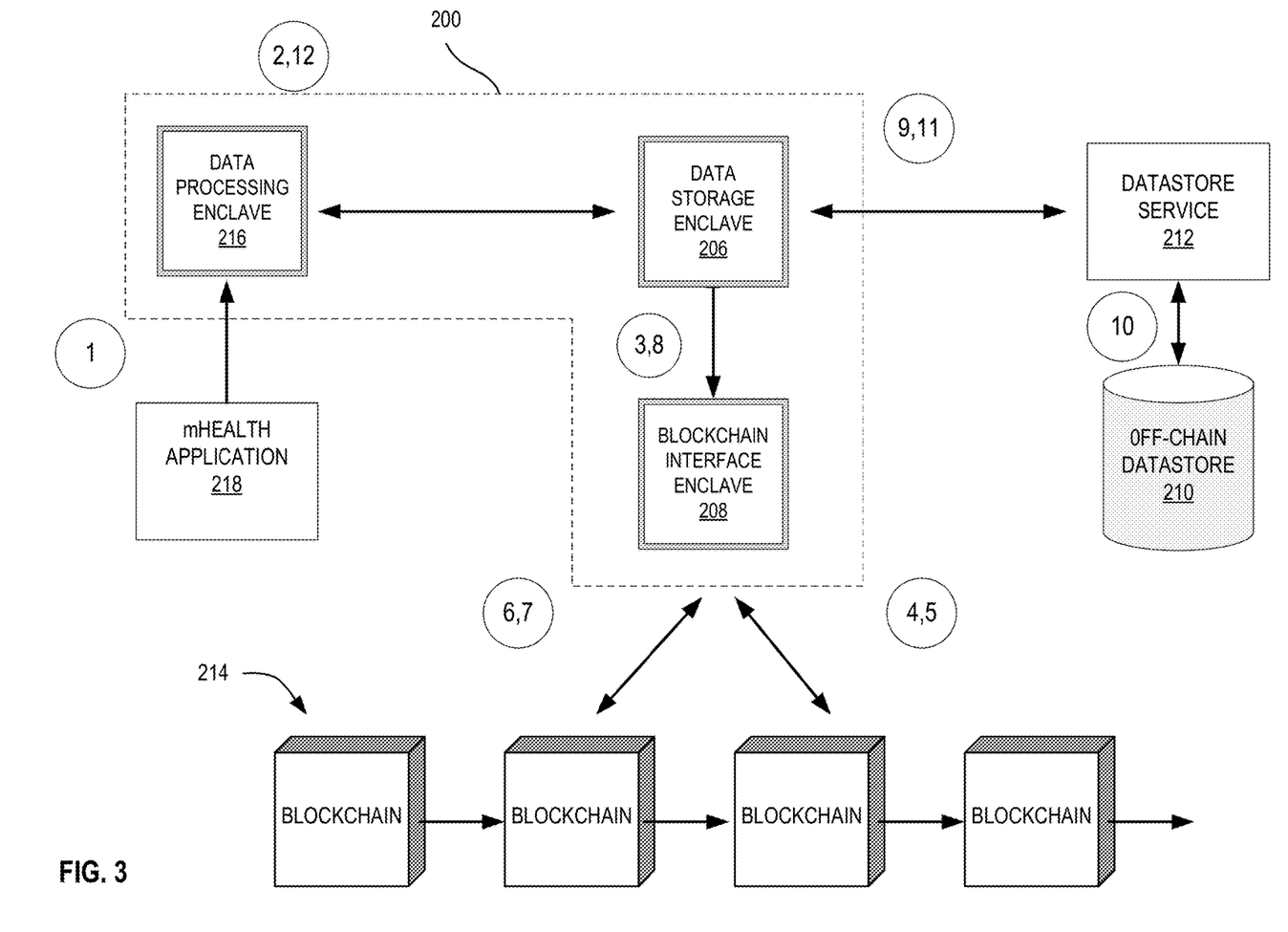
FIG. 3 is a diagram illustrating data flows and interactions when performing confidential computations on data in the system of FIG. 1, in embodiments.
Figure 4:
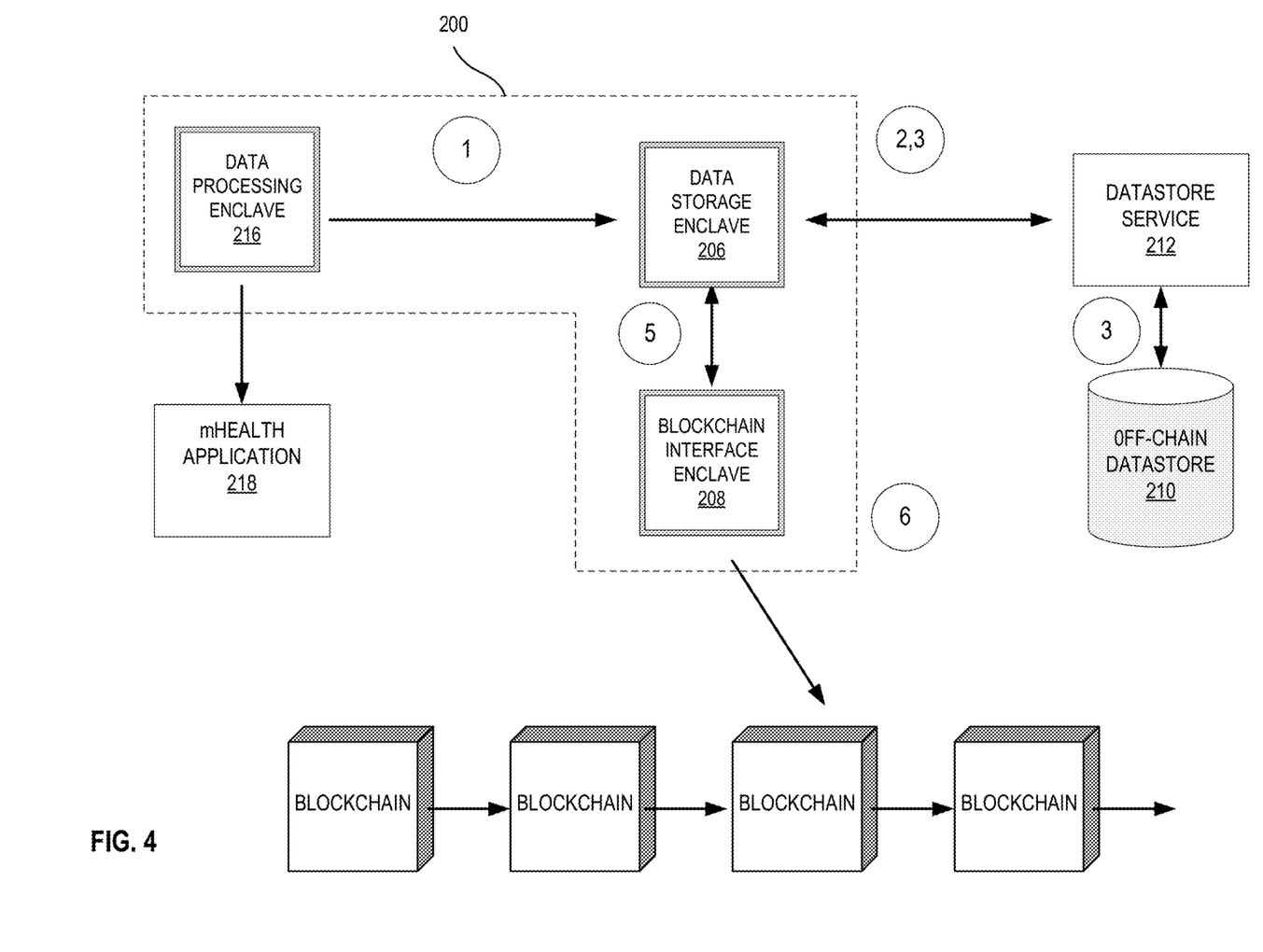
FIG. 4 is a diagram illustrating data flows and interactions when adding new information derived from mHealth and other data in the system of FIG. 1, in embodiments.

FIGS. 2-4 illustrate a data life cycle of a data system 200 with information provenance with regard to mHealth technologies and the streams of health data that they produce. The embodiments described with respect to FIGS. 2-4 discuss adding collected data to the system, performing confidential computations on the data, and storing new information created by the confidential computations to the system. These embodiments are representative for purposes of illustration, other functions and processes are contemplated. FIGS. 2-4 are best viewed together in the following description.

A. Adding mHealth Data

A data life cycle begins with mHealth technologies and the streams of health data that they produce. System 200 of FIG. 2 provides users with the ability to securely store, share, and verify such data streams, but the data must first be added to system 200. Imagine a scenario in which a data subject, Bob, owns an mHealth device, HD 202, and a smartphone SP 204. Bob's device HD 202 produces health data and uploads it to his smartphone SP 204, which serves as a gateway device to system 200. The process for uploading a batch of data, D, generated by HD is depicted FIG. 2 and described in detail below. In general, after being generated, mHealth data is sent to smartphone SP 204, which serves as a gateway device to system 200. Smartphone SP 204 uploads the mHealth data to Data Storage Enclave 206, which encrypts and saves the data to off-chain datastore 210. Afterwards, Data Storage Enclave 206 records provenance metadata on blockchain 214 using blockchain interface enclave 208 so that future data consumers can verify the authenticity and integrity of mHealth data stored in off-chain datastore 210.

All inter-entity communications are carried over pre-established secure channels that provide confidentiality, integrity, and reliability (for data in transit) using standard Internet techniques, e.g., TLS over TCP/IP; for brevity, the details of these connections are not shown. Furthermore, while only a single enclave instance (e.g., Data Storage, Data Processing, Blockchain Interface) is depicted in the figures, there may exist a number of TEE nodes in system 100 that each host one or more enclave instances.

In step 1 of FIG. 2, HD 202 creates a signature, $SIG_{HD}$, to identify itself as the creator of the health data, $D_{HD}$. Then, HD appends its signature to the batch of health data to create a message, $M_{HD}$, which it sends to Bob's smartphone SP 204.

$$SIG_{HD} = SK_{HD}(D_{HD}) \quad (1)$$

$$M_{HD} = D_{HD} \| SIG_{HD} \quad (2)$$

In step 2, Upon receiving $M_{HD}$, Bob's smartphone SP 204 creates a signature using Bob's Signing Key, $SK_{BOB}$, to indicate that Bob is the subject of the data. Then, SP 204 appends Bob's signature to $M_{HD}$, to create an updated message, $M_{SP}$, which it sends to a Data Storage Enclave, DSE 206.

$$SIG_{BOB} = SK_{BOB}(M_{HD}) \quad (3)$$

$$M_{SP} = M_{HD} \| SIG_{BOB} \quad (4)$$

In step 3, DSE encrypts $M_{SP}$ with the Data Key, $K_{HD}$, which is unique to the data stream produced by HD 202. The encrypted data, $C_{HD}$, is then sent to Datastore Service 212.

$$C_{HD} = K_{HD}(M_{SP}) \quad (5)$$

In step 4, Datastore Service 212 treats $C_{HD}$ as a blob and writes it to off-chain Datastore 210.

In step 5, Datastore Service 212 returns a storage index, $I_{HD}$, to DSE 206 that indicates the location of $C_{HD}$.

In step 6, after receiving $I_{HD}$, DSE 206 generates an attestation report, $A_{DSE}$, and calculates a hash, $H_{HD}$, of $M_{SP}$. In an embodiment, TEE hardware mechanisms generate a report containing integrity measurements and signatures that are bound to a specific enclave and TEE platform. This report can then be submitted to the TEE vendor for verification, though system 200 does not perform this last verification step until the next time this specific batch of health data is used. Then, DSE 206 encrypts $K_{HD}$ with the Master Data Key, $K_{MASTER}$, to produce $J_{HD}$. Finally, DSE bundles the provenance metadata into a packet, $P_{HD}$, and sends it to a Blockchain Interface Enclave, BIE 208.

$$H_{HD} = h(M_{SP}) \quad (6)$$

$$J_{HD} = K_{MASTER}(K_{HD}) \quad (7)$$

$$P_{HD} = A_{DSE} \| PK_{HD} \| I_{HD} \| H_{HD} \| J_{HD} \quad (8)$$

In step 7, BIE 208 adds $P_{HD}$ to the smart contract associated with HD.

For efficiency, the mHealth data source, or the smartphone, may choose to upload data records through this pipeline in batches. For example, a pulse oximeter might batch its readings once per minute for upload to the smartphone, which may further batch the data once per hour for upload into the Datastore Service 212. The protocols above apply equally well to such batches; the selection of batch intervals is application-dependent.

B. Confidential Computations

In embodiments, a user of healthcare system with information provenance may grant others permission to access and/or process their health data and information, but instead of sending these "data consumers" a copy of the data, the system requires them to perform their computations using Data Processing Enclave 216 as shown in FIG. 3. Like reference numerals between FIGS. 2 and 3 indicate like components. Since Data Processing Enclave 216 is executed in a TEE, we can ensure the confidentiality of sensitive health data while still providing the consumer proof that their computations were performed correctly.

For some data consumer's application APP 218, we depict the process of retrieving and computing upon data in FIG. 3 and describe the steps in detail below. In embodiments, APP 218 may be executed on smartphone SP 204. Before the confidential computation is performed, the provenance of the input mHealth data is verified to ensure the validity of any information resulting from the computation.

In step 1, APP 218 creates a data-processing request consisting of its Identification key, $PK_{APP}$, the Identification Key of the computation it would like to execute, $PK_{CC}$, and a list of indexes, L, that are used to locate the input health data and information sets. Then APP 218 creates a signature, $SIG_{APP}$, over the request and appends it to the request to create message $M_{APP}$, which it sends to a Data Processing Enclave, DPE 216.

$$SIG_{APP} = SK_{APP}(PK_{APP} \| PK_{CC} \| L) \quad (9)$$

$$M_{APP} = PK_{APP} \| PK_{CC} \| L \| SIG_{APP} \quad (10)$$

In step 2, DPE 216 requests the input data and confidential computation program. from a Data Storage Enclave, DSE 206, by forwarding it $M_{APP}$.

In step 3, DSE 206 requests provenance metadata and the confidential computation program from a Blockchain Interface Enclave, BIE 208 by forwarding it $M_{APP}$.

In step 4, BIE 208 checks $PK_{APP}$ against permission lists recorded in the blockchain for each of the specified input data sets contained L.

In step 5, for every input data set for which $PK_{APP}$ has access, its provenance metadata is returned by the blockchain to BIE 208.

In step 6, BIE 208 must also check that $PK_{APP}$ has permission to use the computation specified by $PK_{CC}$.

In step 7, if $PK_{APP}$ has permission to use $PK_{CC}$, an encrypted program containing the computation and an encrypted encryption key is returned by the blockchain to BIE 208.

In step 8, BIE 208 returns the provenance metadata and program to DSE 206.

In step 9, if the confidential computation program or any provenance metadata is missing, or one or more permissions checks failed, DSE 206 returns a permission failure to DPE 216. Otherwise, DSE 206 verifies $SIG_{APP}$ contained in $M_{APP}$.

$$(true|false) = PK_{APP}(SIG_{APP}) \quad (11)$$

If the permissions checks pass and $SIG_{APP}$ is verified, DSE 206 forwards L to the Datastore Service 212 to request the input data sets.

In step 10, Datastore Service 212 retrieves the encrypted data sets specified by L and returns them, C, to DSE 206.

In step 11, DSE 206 first decrypts each encrypted Data Key, I, contained in the provenance metadata packets using its Master Data Key, $K_{MASTER}$. Then, DSE 206 uses each decrypted Data Key, K, to decrypt each encrypted health data set, C and the confidential computation program. With C decrypted, DSE 206 may then verify the hash of the input data sets and their signatures. Finally, DSE 206 verifies any enclave attestations contained within the provenance metadata packets by sending them to the attestation service. If all of these provenance checks pass, the plaintext data sets and confidential computation program are returned to DPE 216.

$$M_{SP} = K_{HD}(C_{HD}) \quad (12)$$

$$\text{where } M_{SP} = D_{HD} \| SIG_{HD} \| SIG_{BOB} \quad (13)$$

$$(true|false) \leftarrow H_{HD} == h(M_{SP}) \quad (14)$$

$$(\text{true}|\text{false}) = PK_{HD}(SIG_{HD}) \quad (15)$$

$$(\text{true}|\text{false}) = PK_{SP}(SIG_{BOB}) \quad (16)$$

In step 12, if DPE 216 receives all of the specified input data and the confidential computation program, then it can assume the application has the appropriate permissions and that the input data sets passed the provenance checks. The DPE then executes the decrypted computation program providing the specified data sets as input.

The results of the computation are then returned to APP 218, and written to off-chain storage by DSE 206 (as described below).

C. Adding Computed Information

Applications can process raw mHealth data and information via Data Processing Service. Any new information created as a result of this processing is added to system 200 and returned to the requesting application. This process is depicted in FIG. 4 and described in detail below. The output of confidential computations is new mHealth data, or information. Similar to the process for adding mHealth data, information is added to system 200 by Data Storage Enclave 206. On top of the provenance metadata recorded for mHealth data, Data Storage Enclave 206 records provenance metadata to show what computation was performed, and on what input data sets, to produce the resulting information.

In step 1, after completing a data-processing request, a Data Processing Enclave, DPE 216, returns the resulting information, $R_{CC}$, to APP 218. DPE 216 generates an attestation report, $A_{DPE}$, showing that it correctly executed the requested computation. This attestation report, $A_{DPE}$, is then bundled together with the resulting information, $R_{CC}$, the application's Identification Key, $PK_{APP}$, the computation's Identification Key, $PK_{CC}$, and the list of input data set indexes, L, to form a message, $M_{DPE}$, which is sent to a Data Storage Enclave, DSE 206.

$$M_{DPE} = R_{CC} \| L \| PK_{APP} \| PK_{CC} \| A_{DPE} \quad (17)$$

In step 2, DSE 206 encrypts $M_{DPE}$ with the Data Key, $K_{CC}$, which is unique to the computation that produced $R_{CC}$. The encrypted data, $C_{CC}$, is then sent to Datastore Service 212 for storage.

$$C_{CC} = K_{CC}(M_{DPE}) \quad (18)$$

In step 3, Datastore Service 212 treats $C_{CC}$ as a blob and writes it to off-chain datastore 210.

In step 4, Datastore Service 212 returns a storage index, $I_{CC}$, to DSE 206 that indicates the location of $I_{CC}$.

In step 5, after receiving $I_{CC}$, DSE 206 generates an attestation report, $A_{DSE}$, and calculates a hash, H, of $M_{DPE}$.

Then, DSE 206 encrypts $K_{CC}$ with the Master Data Key, $K_{MASTER}$, to produce $J_{CC}$.

Finally, DSE 206 bundles the provenance metadata into a packet, $P_{CC}$, and sends it to a Blockchain Interface Enclave, BIE 208.

$$H_{CC} = h(M_{DPE}) \quad (19)$$

$$J_{CC} = K_{MASTER}(K_{CC}) \quad (20)$$

$$CC = A_{DPE} \| A_{DSE} \| H_{CC} \| I_{CC} \| J_{CC} \quad (21)$$

In step 6, BIE 208 adds $P_{CC}$ to the smart contract associated with CC.

Figure 5:
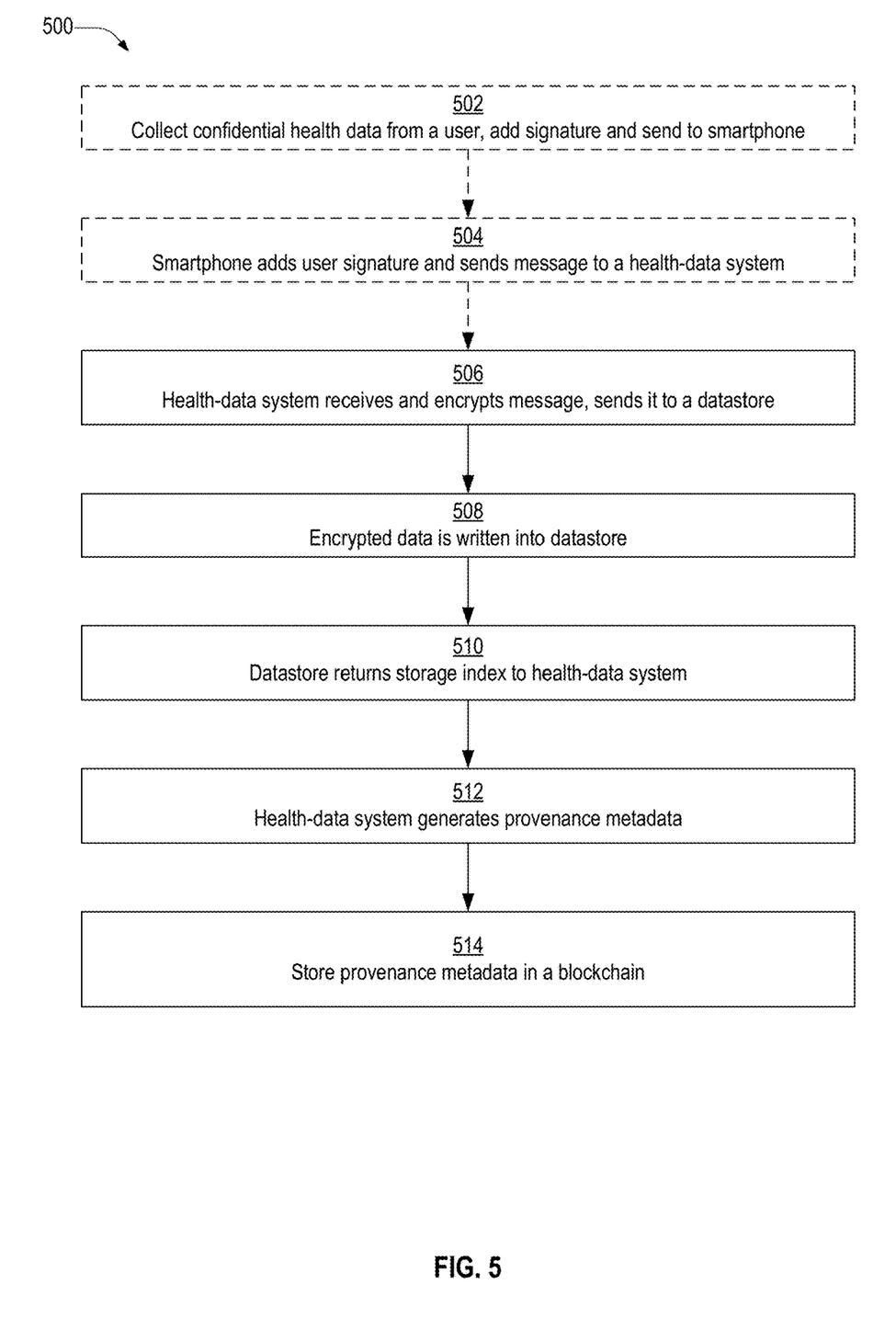
FIG. 5 is a flowchart illustrating a method for adding raw mHealth data to a data system with information provenance, in embodiments.
Figure 6:
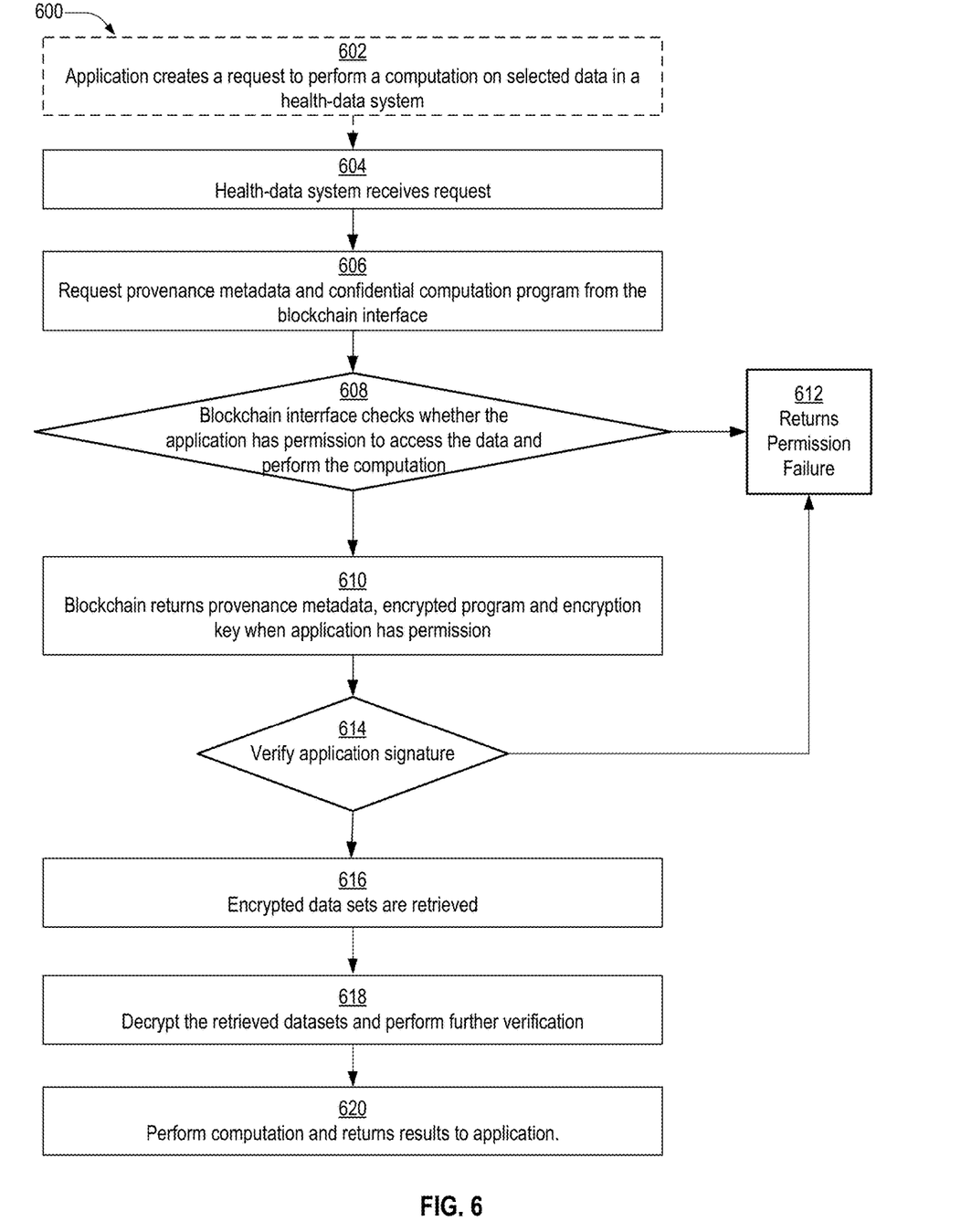
FIG. 6 is a flowchart illustrating a method for performing confidential computations of mHealth data stored in a data system, in embodiments.
Figure 7:
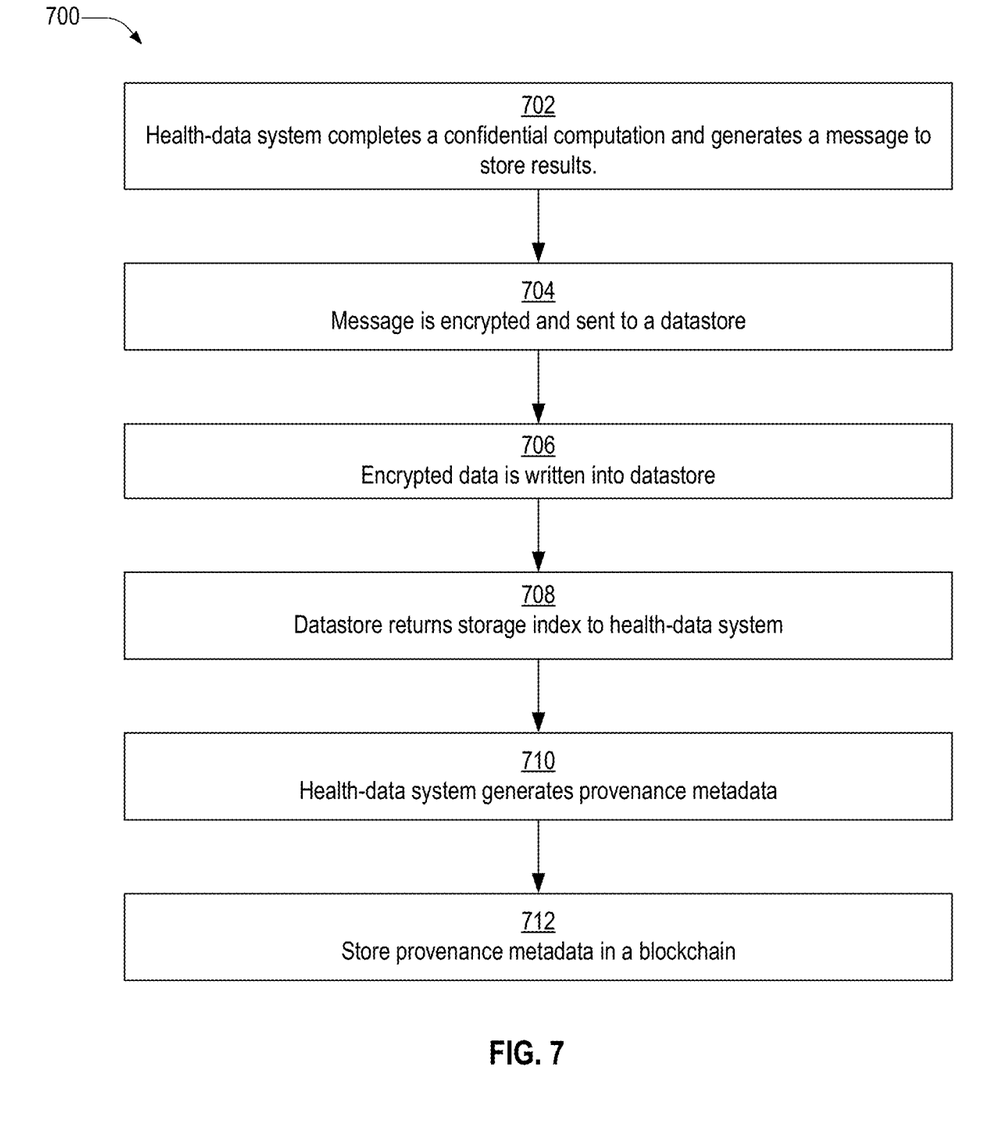
FIG. 7 is a flowchart illustrating a method for storing information resulting from confidential computations on mHealth data, in embodiments.

A more generalized discussion of principles disclosed herein is provided in connection with FIGS. 5-7.

FIG. 5 is a flowchart illustrating a method 500 for adding raw mHealth data to a data system with information provenance. Method 500 includes steps 506, 508, 510, 512 and 514. In embodiments, method 500 also includes at least one of steps 502 and 504.

Step 502 includes collecting confidential health data from a data subject with a device, adding a signature and sending it to a smartphone. In an example of step 502, the device may be mHealth Device HD 202 which creates a signature, $SIG_{HD}$, to identify itself as the collector of the health data, $D_{HD}$. Then, HD 202 appends its signature to the batch of health data to create a message, $M_{HD}$, which it sends to smartphone SP 204 or other device that may be connected, wirelessly or otherwise, to HD 202.

Step 504 includes adding a subject signature and sending the message to a data system. In an example of step 504, SP 204 receives $M_{HD}$, and creates a signature identifying the subject of HD 202 using Signing Key, $SK_{SUBJECT}$, to indicate the subject of the data. Then, SP 204 appends $SK_{SUBJECT}$ to $M_{HD}$, to create an updated message, $M_{SP}$, which it sends to Data Storage Enclave, DSE 206, which is one of the applications executed by TEE network 104, part of a data system with information provenance.

Step 506 includes receiving and encrypting the message and sending it to a datastore. In an example of step 506, DSE 206 encrypts $M_{SP}$ with the Data Key, $K_{HD}$, which is unique to the data stream produced HD 202. The encrypted data, $C_{HD}$, is then sent to Datastore Service 212. In embodiments, DSE 206 may receive a message including signed data collected from a variety of devices. Signatures should identify the source of the data and the data subject, in embodiments.

Step 508 includes writing the encrypted data to an datastore. In an example of step 508, Datastore Service 212 does not need to know the contents of $C_{HD}$ and may write it to Off-Chain Datastore 210 as an encrypted block of data. In embodiments, the term datastore as used for Datastore Service 212 and Off-Chain Datastore 210 may be any type of persistent storage, such as a server or cloud-based storage. They may also be incorporated in one or more hardware devices.

Step 510 includes returning an index to the data system. In an example of step 510, Datastore Service 212 receives a storage index, $I_{HD}$, from Off-Chain Datastore 210 that indicates the address where $C_{HD}$ was written and returns it to DSE 206.

Step 512 includes generating provenance metadata. In an example of step 512, DSE 206 generates provenance metadata including the index, $I_{HD}$, a hash, $H_{HD}$, calculated from $M_{SP}$, and an encryption of the device data key with $K_{HD}$ with the Master Data Key, $K_{MASTER}$. In an embodiment, DSE 206 generates an attestation report, $A_{DSE}$, a security feature of a TEE network that contains integrity measurements and signatures that are bound to a specific enclave and TEE platform. Provenance metadata may also include the attestation report and an identification key of HD 202, $PK_{HD}$. Finally, DSE 206 bundles the provenance metadata into a packet, $P_{HD}$, and sends it to a Blockchain Interface Enclave, BIE 208.

Step 514 includes storing the provenance metadata packet in a blockchain. In an example of step 514, BIE 208 stores the provenance metadata packet in the blockchain by writing a transaction to the blockchain. In embodiments, BIE 208 adds $P_{HD}$ to the smart contract associated with HD 202.

FIG. 6 is a flowchart illustrating a method 600 for performing confidential computations of confidential data stored in a data system with information provenance. In embodiments, a data subject may grant others permission to access and/or process their confidential health data and information, but instead of sending these "data consumers" a copy of the data, the system requires them to perform their computations using an application, such as mHealth Application APP 218, that access data through data system 200. APP 218 may be executed on a variety of devices including, for example, a smartphone, tablet or laptop. Before the confidential computation is performed, the provenance of the confidential data is verified to ensure the validity of any information resulting from the computation. Method 600 includes steps 604-620. In embodiments, method 600 also includes step 602.

In step 602, an application creates a request to perform a computation on selected data in a data system. In an example of step 602, APP 218 creates a data-processing request consisting of its Identification key, $PK_{APP}$, the Identification Key of the computation it would like to execute, $PK_{CC}$, and a list of indexes, L, that are used to locate the input health data and information sets. Then APP 218 creates a signature, $SIG_{APP}$, over the request and appends it to the request to create message $M_{APP}$, which it sends to a Data Processing Enclave, DPE 216.

In step 604, the data system receives the request. In an example of step 604, DPE 216 of data system 200 requests the input data identified in the list of indexes L and confidential computation program of the computation to be executed from a Data Storage Enclave, DSE 206, by forwarding it $M_{APP}$.

In step 606, DSE requests provenance metadata and a computational program from the blockchain interface. In an example of step 606, DSE 206 requests provenance metadata and the confidential computation program from a Blockchain Interface Enclave, BIE 208 by forwarding it $M_{APP}$.

In step 608, the blockchain interface checks whether the application has permission to access the data and to perform the computation. In an example of step 608, BIE 208 checks $PK_{APP}$ against permission lists recorded in the blockchain for each of the specified input data sets contained L. BIE 208 also checks that $PK_{APP}$ has permission to use the computation specified by $PK_{CC}$.

In step 610, the blockchain returns provenance data, an encrypted program and encryption key when application has permission to access that data. In an example of step 610, for every input data set for which $PK_{APP}$ has access, its provenance metadata is returned by the blockchain to BIE 208. An encrypted program containing the computation and an encrypted encryption key is returned by the blockchain to BIE 208 when $PK_{APP}$ has permission to use $PK_{CC}$. BIE 208 returns the provenance metadata and program to DSE 206.

In step 612, if the confidential computation program or any provenance metadata is missing, or one or more permissions checks failed, DSE 206 returns a permission failure to DPE 216.

In step 614, the application signature is verified. In an example of step 614, if the permissions checks pass, DSE 206 verifies the application signature, $SIG_{APP}$, contained in $M_{APP}$. If $SIG_{APP}$ is verified, DSE 206 forwards L to the Datastore Service 212 to request the input data sets.

In step 616, encrypted data sets are retrieved. In an example of step 616, Datastore Service 212 retrieves the encrypted data sets specified by L and returns them, C, to DSE 206.

In step 618, the DSE decrypts the data sets and performs additional verifications. In an example of step 618, DSE 206 first decrypts each encrypted Data Key, I, contained in the provenance metadata packets using its Master Data Key, $K_{MASTER}$. Then, DSE 206 uses each decrypted Data Key, K, to decrypt each encrypted health data set, C and the confidential computation program. With C decrypted, DSE 206 may then verify the hash of the input data sets and their signatures. Finally, DSE 206 verifies any enclave attestations contained within the provenance metadata packets by sending them to the attestation service. If all of these provenance checks pass, the plaintext data sets and confidential computation program are returned to DPE 216.

In step 620, perform the computation on the confidential data. In an example of step 620, if DPE 216 receives all of the specified input data and the decrypted confidential computation program, then it can assume the application has the appropriate permissions and that the input data sets passed the provenance checks. It should then carry out the specified computation using the input data sets, return the results of the computation are then returned to APP 218, and write them to off-chain storage.

FIG. 7 is a flowchart illustrating a method 700 for storing information resulting from confidential computations on mHealth data, in embodiments. Applications can process raw mHealth data and information via Data Processing Service as explained above in FIG. 6. Any new information created as a result of this processing is added to system 200 and returned to the requesting application. The output of confidential computations is new mHealth data, or information. Similar to the process for adding mHealth data, information is added to system 200 by Data Storage Enclave 206. On top of the provenance metadata recorded for mHealth data, Data Storage Enclave 206 records provenance metadata to show what computation was performed, and on what input data sets, to produce the resulting information.

In step 702, a data system completes a confidential computation and generates a message to store results. In an example of step 702, DPE 216 generates an attestation report, $A_{DPE}$, showing that it correctly executed the requested computation. This attestation report, $A_{DPE}$, then bundled together with the resulting information, $R_{CC}$, the application's Identification Key, $PK_{APP}$, the computation's Identification Key, $PK_{CC}$, and the list of input data set indexes, L, to form a message, $M_{DPE}$, which is sent to a Data Storage Enclave, DSE 206.

In step 704, the message is encrypted and sent to a datastore. In an example of step 704, DSE 206 encrypts $M_{DPE}$ with the Data Key, $K_{CC}$, which is unique to the computation that produced $R_{cc}$. The encrypted data, $I_{CC}$, is then sent to Datastore Service 212 for storage.

In step 706, Datastore Service writes encrypted data to Off-Chain Datastore. In an example of step 706, Datastore Service 212 does not need to know the contents of $C_{CC}$ and may write it to Off-Chain Datastore 210 as an encrypted block of data.

In step 708, The datastore returns a storage index to the data system. In an example of step 708, Datastore Service 212 returns a storage index, $I_{CC}$, to DSE 206 that indicates the location of $C_{CC}$.

In step 710, the data system generates provenance metadata. In an example of step 710, after receiving $I_{CC}$, DSE 206 generates an attestation report, $A_{DSE}$, and calculates a hash, H, of $M_{DPE}$. Then, DSE 206 encrypts $K_{CC}$ with the Master Data Key, $K_{MASTER}$, to produce $J_{CC}$. Finally, DSE 206 bundles the provenance metadata into a packet, $P_{CC}$, and sends it to a Blockchain Interface Enclave, BIE 208.

Step 712 includes storing the provenance metadata packet in a blockchain. In an example of step 712, BIE 208 stores the provenance metadata packet in the blockchain by writing a transaction to the blockchain. In embodiments, BIE 208 adds PCC to the smart contract associated with CC.

Embodiments described above may be implemented in a variety of ways. A representative system for implementation may be built using VeChain Thor, a public blockchain, which is based on the Ethereum blockchain. Like Ethereum, Thor is an account-based blockchain with a custom virtual machine for executing user written smart contracts. Thor differs from Ethereum in many ways, however, as it introduces a dual-coin model, a Proof-of-Authority (PoA) consensus mechanism, and support for transaction clauses and enforced transaction ordering(cite). Whereas Ethereum uses a Proof-of-Work (PoW) consensus algorithm that allows anybody to validate transactions, Thor entrusts a small consortium of authorized entities to validate blocks on the blockchain(cite). This hybrid model allows anybody to participate in reading and writing transactions to the Thor blockchain, but only the consortium is allowed to create new blocks. While PoA is more centralized than the consensus protocols used in blockchains such as Ethereum or Bitcoin, having a small number of block validators makes it so that the Thor blockchain has a much higher transaction throughput than traditional PoW based consensus protocols(cite).

There are also several commercial implementations of TEE platforms, a representative system for implementation with any of the above embodiments is Intel's Software Guard Extensions (SGX) platform. The SGX extensions to the Intel architecture aim to provide integrity and confidentiality guarantees to security-sensitive computation performed on a computer where all the privileged software (kernel, hypervisor, etc.) is potentially malicious. Not only can SGX provide security for applications in a compromised environment, it provides software attestations to users of the application. The software attestation proves to users that they are communicating with a specific piece of software running in a secure container hosted by the trusted hardware.

Changes may be made in the above system, methods or device without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

The invention claimed is:

1. A system for maintaining information provenance of confidential data, comprising:
  a device generating raw data;
  a blockchain network storing smart contracts and provenance metadata; and
  a trusted execution environment (TEE) network comprising hardware and software for providing secure execution of instructions stored in a computer-readable memory, said TEE network:
  storing the raw data by:
    receiving the raw data from the device;
    encrypting the raw data to produce a new encrypted data;
    storing the new encrypted data in a datastore; and
    recording a first provenance metadata on the blockchain network, wherein the first provenance metadata comprises (1) a first hash of the raw data, (2) a first address of the new encrypted data in the datastore, (3) a first key encrypted form of a first encryption key that was used to encrypt the raw data, and (4) a first attestation report generated by a first TEE that stored the new encrypted data; and
  performing computations on the new encrypted data in the datastore by:
    verifying the first provenance metadata of the new encrypted data retrieved from the datastore in response to a computation request, executing confidential computations on the new encrypted data retrieved from the datastore and storing a result encrypted data in the datastore, wherein the result encrypted data comprises a confidential computation result, a second attestation report, and a list of input set data indexes; and
    recording a second provenance metadata on the blockchain network, wherein the second provenance metadata comprises (1) a hash of the result encrypted data, (2) an address of the result encrypted data in the datastore, (3) a second key encrypted form of a second key that was used to encrypt the result encrypted data, and (4) a third attestation report generated by the TEE that stored the result encrypted data, for verifying a result of the confidential computations.

2. The system of claim 1, further comprising a gateway device receiving the raw data from the device, adding a signature, and sending the raw data and the signature to the TEE network.

3. The system of claim 2, wherein the gateway device further uploads the raw data into batches to send to the TEE network.

4. The system of claim 1, wherein the blockchain network comprises a plurality of nodes maintained by a consortium.

5. The system of claim 1, wherein verifying the first provenance metadata of the new encrypted data retrieved from the datastore further comprises:
  receiving a request from an application to access the new encrypted data to perform a computation;
  requesting the first provenance metadata from a blockchain interface;
  checking whether the application has permission to access the new encrypted data and perform the computation;
  when an application has the permission, the blockchain network provides the first provenance metadata, an encrypted computation program, and encrypted data keys;
  verifying a signature of the application;
  retrieving the new encrypted data from the datastore; and
  decrypting the first encrypted key with a master data key, then decrypting the new encrypted data and the encrypted computation program using the decrypted first encrypting key and verifying hashes of the decrypted data.

6. The system of claim 1, wherein the device for generating raw data is a mobile health device that monitors an aspect of a wearer's health during regular activities.

7. The system of claim 6, wherein the mobile health device is a smart watch, heart rate monitor or glucose monitor.

8. The system of claim 2, wherein the gateway device is a smart phone, smartwatch, tablet, laptop, or non-mobile device.

9. The system of claim 8, wherein the signature added to the raw data by the gateway device identifies a wearer of the device.

10. The system of claim 1, wherein TEE network is a secure computing environment resistant to privileged software attacks and hardware attacks.

* * * * *